Figure 1:
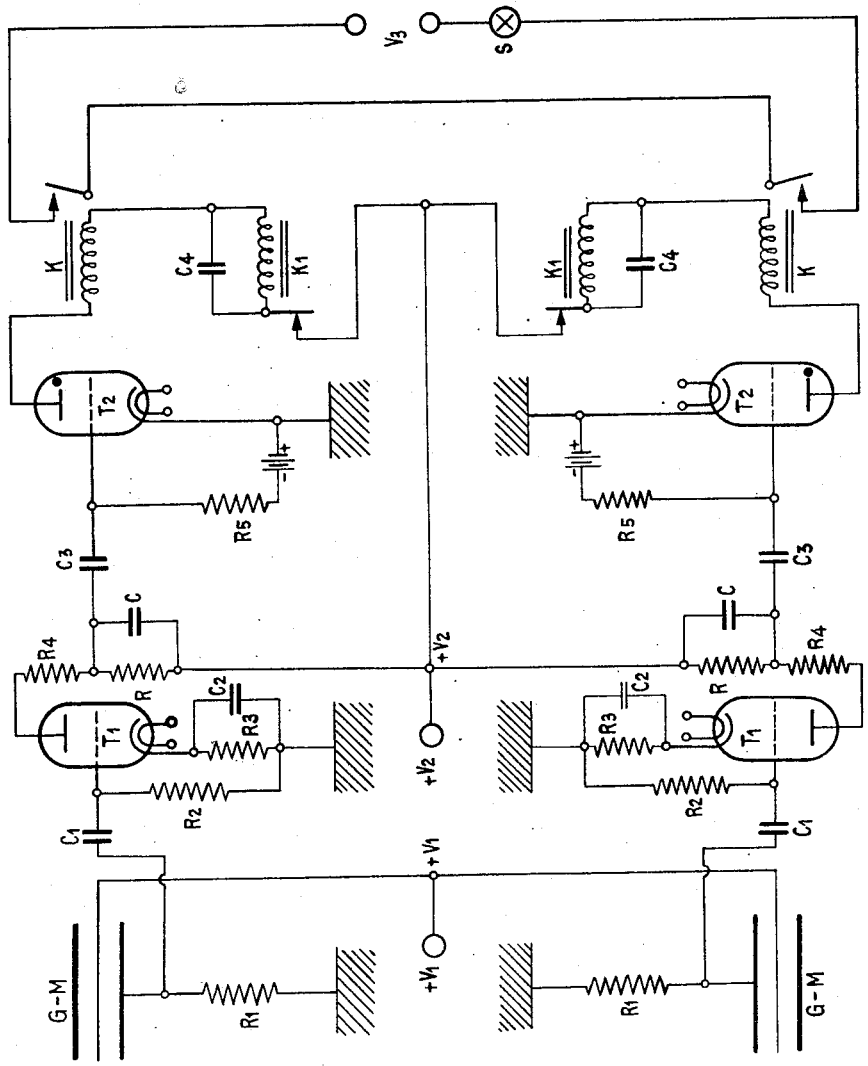

Dec. 2, 1952 E. VOGT ET AL 2,620,435
TRANSMISSION OF SIGNALS BETWEEN TWO OBJECTS
MOVING RELATIVE TO EACH OTHER
Filed March 15, 1949 3 Sheets-Sheet 2

Dec. 2, 1952          E. VOGT ET AL         2,620,435
TRANSMISSION OF SIGNALS BETWEEN TWO OBJECTS
MOVING RELATIVE TO EACH OTHER
Filed March 15, 1949                                 3 Sheets-Sheet 3
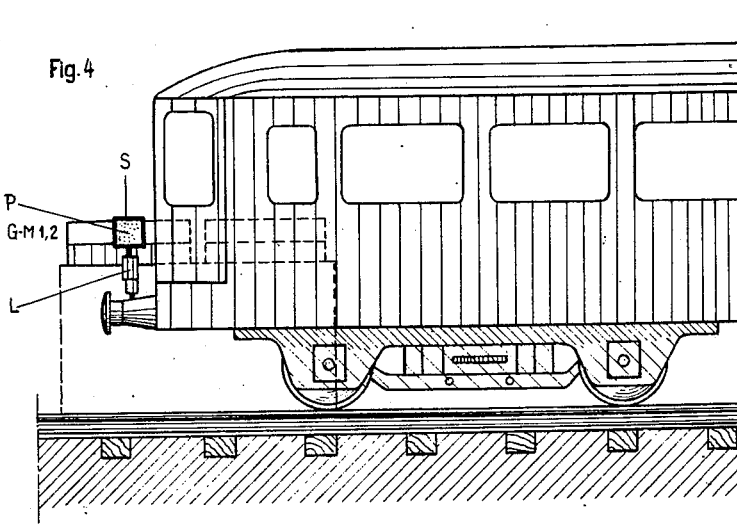

Patented Dec. 2, 1952

2,620,435

UNITED STATES PATENT OFFICE 2,620,435

TRANSMISSION OF SIGNALS BETWEEN TWO OBJECTS MOVING RELATIVE TO EACH OTHER

Ernst Vogt, Wallisellen, and Walter Gerhard Heilpern, Zurich, Switzerland, assignors to Societe Technique pour l'Industrie Nouvelle S. A. "Stin," Vevey, Switzerland Application March 15, 1949, Serial No. 81,524 In Switzerland April 10, 1946

3 Claims. (Cl. 246—29)

The present invention concerns itself, in general, with the transmission of signals between two objects moving relative to each other. More specifically, this invention relates to devices utilizing radioactive radiation as a medium of transmission.

The main object of this invention is: to utilize as a signal transmission medium of radioactive radiation provided by distintegrating atomic nuclei. Other objects are: to employ as detection apparatus a Geiger-Muller counting tube in connection with an integrating circuit; to operate several counting tubes or several complete counting circuits in coincidence; to use for detection the recently discovered scintillation method; to use for detection crystal counters; to provide trains with radioactive preparations and railroad sections with radioactive sensitive apparatus for the purpose of transmitting signals between the two; to provide trains with a radioactive sensitive apparatus and railroad sections with a radioactive preparation for the purpose of transmitting signals between the two.

Hitherto, the various electromagnetic waves have been used for the transmission of signals between two objects moving relative to each other, e. g., for the protection of trains. Especially well known, in this connection is the application of radio waves (wave-length of about 100 meters), the so called high frequency and ultra-high frequency electromagnetic waves, as well as light waves. Electromagnetic waves of shorter wavelength than light waves were previously not used for the transmission of signals because of the lack of suitable detection apparatus for this purpose. However, within the last fifteen years such apparatus has been developed in ever increasing numbers for measuring in the field of atomic physics.

The proposed invention employs these very short electromagnetic waves for transmission of signals between two objects moving relative to each other. The advantage of these waves as opposed to radio waves are: their wavelength is not of the magnitude of macroscopic bodies and surfaces, so that disturbing reflections and diffraction phenomenon will thereby be avoided; they are distinct from light waves through their great penetrability, especially in their independence from atmospherical influences such as fog, snow, etc.

However, the greatest advantage lies in the use of gamma ($\gamma$-) radiation which appears as so called radioactive radiation with the disintegration of atomic nuclei. Thus energy sources are present which are easily transportable; consequently no outside energy source is necessary. Therefore, the proposed invention applies, in general, to radioactive radiation which appears with the disintegration of atomic nuclei.

These energy sources serving radioactive preparations can exist either out of natural radioactive materials (e. g., materials whose atom nucleus disintegrates spontaneously as does the nucleus of the atoms of uranium, actinium, thorium, and their by-products) or out of artificial radioactive materials (e. g., materials whose atom nucleus is disintegrated through outside influence). The preparations will be so chosen that the $\gamma$-radiation is of the greatest possible intensity. Alpha ($\alpha$-) and beta ($\beta$-) radiations are also present in the radioactive radiation. However, for the here discussed purpose, the range of the $\alpha$- and $\beta$-radiation is too small for present detection apparatus; its use is expressly reserved for a later time.

The detection apparatus being used for the $\gamma$-radiation is the Geiger-Muller counting tube (G-M tube). For large tubes the sensitivity is sufficiently great that radioactive preparations may be applied whose intensity and thereby whose cost are moderate. The difficulties which arise due to background-count from other but weaker, sources (radioactivity of the earth, cosmic radiation) can be avoided by the use of integrating circuits combined with coincidence circuits.

The essential part of the integrating circuit is the R-C branch. This consists of a condenser C which is charged by the pulses delivered from the G-M tube and which discharges simultaneously through a resistor R in a given time. This discharge time is so chosen as to make it entirely improbable that the condenser can be brought to the critical voltage (at which point the transmission of the signal is accomplished). In the same time, however, the radioactive preparation gives rise to so many counts that the condenser is certainly charged to the critical voltage before it can discharge itself through the resistance. The intensity of background-count may also be reduced by the use of several G-M tubes operating in coincidence. Thus, it is possible that only such background radiation having the same angle of incidence as the radiation produced by the radioactive preparation will be counted. Moreover several complete counting devices containing integrating circuits in addition to G-M tubes may be operated in coincidence for insurance against spontaneous counts of the simpler circuit. This will be explained by the fact that the number of counts fluctuates statistically. Thus it may be possible that the background rate only of the counts is sufficiently great to charge the condenser of the integrating circuit. Although this event happens seldomly, a severe disturbance of the signaling circuit may result. On the other hand it is extremely improbable that such accidental high rates of background may occur in two G-M tubes with integrating circuits at the same time. This may easily be computed using the laws of probability and will be shown by the following example:

The discharge time of the condenser may be $1/50$ second. During this time the radioactive preparation gives rise to 10 pulses thus charging the condenser to the critical voltage. On the other hand the average rate of background count in the same interval is 2 counts. Using Poisson's law it can be easily calculated that the probability for bringing the condenser to the critical voltage by background count only is $3.85 \cdot 10^{-5}$. That means that every $$\frac{1/50}{3.85 \cdot 10^{-5}} \text{ seconds} = 8\tfrac{1}{2} \text{ minutes}$$

there will be a spurious charge of the condenser which results in a false release of the signal. Now we consider the case where two complete such counting circuits are connected in coincidence, whereby the counting tubes may be placed so close one to the other that they are irradiated by the preparation at the same time. The counting rate produced by the preparation will thus remain the same; moreover the probability for bringing the condenser to the critical voltage by background count only will drop to $2 \cdot (3.85 \cdot 10^{-5})^2$. That means that spurious charges of the condenser and false release of the signal will only occur every $2\tfrac{1}{2}$ months which is an improvement indeed.

Such circuits as described above are well-known in modern laboratory practice especially in nuclear physics. For coincidence circuits see for instance: J. Strong, Modern Laboratory Practice, London and Glasgow, 1938, page 289, and in: Serge A. Korff, Electron and Nuclear Counters, page 183. An integrating circuit which is very similar to the arrangement quoted above is shown in: Paul B. Weiss, Electronic fire and flame detector, "Electronics," 1946, July, page 106. In this article a fire-detection device is described which contains G-M tubes being sensitive for ultraviolet radiation.

Recently discovered methods being especially sensitive for the detection of $\gamma$-radiation can also be applied to this invention. One of these methods employs the transformation of $\gamma$-radiation into ultraviolet or visible light by means of crystals, such as naphthaline, which light can then be detected by photo-cells or multipliers. The other uses crystals, such as diamond, as counting element for $\gamma$-radiation.

A specific circuit diagram of the detection device described in principle above is shown in the accompanying drawing (Fig. 1). It consists of two G-M tubes, each with integrating circuit, both complete circuits operating in coincidence. The principal function of such circuits containing G-M tubes are explained in many books and articles as for instance in: J. Strong, Modern Physical Laboratory Practice, London and Glasgow, 1938, page 276–277, furthermore: Serge A. Korff, Electron and Nuclear Counters, New York, 1946, page 157. Thus it will be sufficient to describe the special features only of the circuit shown in the drawing.

The first stage of each G-M tube circuit serves as amplifier and at the same time (through the R-C branch mentioned above) as integrator of the amplified pulses. When the condensers C are charged to the critical voltage, the gas triodes will become conducting and operate the relays K. These relays are connected in series to the signaling device. Thus the signal is effected only when both condensers C are brought to the critical voltage at the same time by a sufficient number of counts. The function of the relays $K_1$ is to quench the thyratron current. G-M are the Geiger-Müller counting tubes. $T_1$ are usual triodes, $T_2$ are gas triodes, K and $K_1$ are the relays described above, $V_1$ is the positive pole of the high voltage for the G-M tube, $V_2$ is the connection for the positive anode voltage for the tubes $T_1$ and $T_2$. The points S are the connection to the exterior signaling circuit. The resistors and condensers may have the following values (the values are the same for both of the single circuits): $R_1 = 5 \cdot 10^5 \Omega$, $R_2 = 10^6 \Omega$, $R_3 = 2000 \Omega$, $R_4 = 5 \cdot 10^4 \Omega$, $R_6 = 10^6 \Omega$, $C_1 = 50$ pf., $C_2 = 0.5$ µf., $C = 5000$ pf. $C_4 = 40$ µf., $R = 10^4 \Omega$, $C = 5$ µf. (for a time constant of $1/20$ second).

When the last car of a train with the $\gamma$-ray source passes along the counting tubes G-M the number of incident $\gamma$-quanta may be so great that numerous electrons will be released. Every such electron produces a current impulse through the G-M tubes and the resistors $R_1$, thus rendering the grids of the first tubes $T_1$ more positive and increasing the plate currents and the voltages across resistors R and condensers C which are connected in parallel. The pulses of plate current which are caused by the numerous primary electrons in the counting tube will follow so quickly that the condensers C cannot discharge through the resistors R in the meantime, hence the voltage across the condensers C will reach the critical value to fire the thyratrons $T_2$ at the same time. Thus both relays K will be operated and work the signaling circuit S. With a certain delay caused by the condensers $C_4$ the thyratrons are quenched by the relays $K_1$ and brought to the initial state.

In the application of the invention to automatic train control radioactive preparations emitting $\gamma$-radiation may be placed on railroad track sections and detection apparatus for $\gamma$-radiation may be conveyed by trains in order to transmit signals between railroad section and train. Conversely radioactive preparations may be conveyed by trains and detection apparatus may be placed on railroad sections.

A special example relating to automatic block signaling is described below and designed in the accompanying drawing (Fig. 2):

A radioactive preparation is conveyed at the end of the train and the detection apparatus is placed on the track section near its end. Thus the preparation when passing along the detection apparatus verifies that the last car has left this section.

When the detection apparatus is operated by the radiation from the preparation the section-entering signal of the block-section just abandoned will be changed from the Stop position to the Caution position while the section-entering signal of the preceding block section which was at Caution will be cleared. The track-occupancy of the section which the train enters after having passed the detection apparatus may be accomplished by means of a small short-rail track circuit shunted by the axles of the first vehicle of the train. Thus the section-entering signal of this block section is converted from the Free position to the Stop position. Thus it is possible to verify that the whole of the train has passed out of this section.

Figure 2:
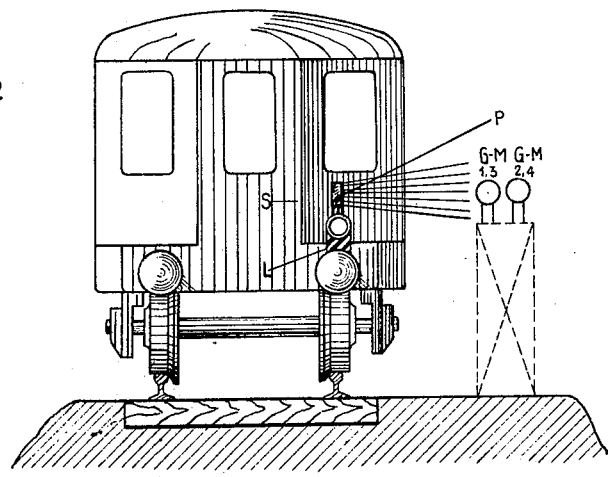
Figure 3:
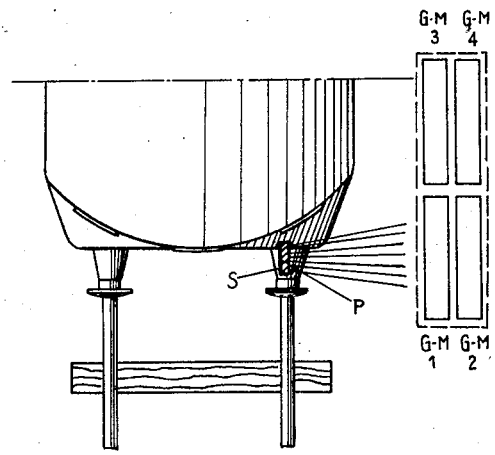

Referring to this example Fig. 2 deals with the last carriage of a train located on a part of a track section near its end. The radioactive preparation P is placed above the tail light L of the train. It is surrounded by a screen of lead S on three sides. Thus radiation can get out only in the direction where the G-M tubes G-M are placed aside the track.

Four G-M tubes are designed in such way that each arranged pair (G-M1 and G-M2 as well as G-M3 and G-M4) may be operated in coincidence. Each pair of G-M tubes may be connected to a separate integrating circuit both of them operating in coincidence the signaling device.

Consequently the diagram of Fig. 1 explains the function of the G-M tubes arranged in Fig. 2 with the restriction that each G-M tube in Fig. 1 corresponds to a pair of G-M tubes in Fig. 2 (G-M1 in Fig. 1 to the pair of G-M1 and G-M2 in Fig. 2, as well as G-M2 in Fig. 1 to the pair of G-M3 and G-M4 in Fig. 2).

What we claim as our invention and desire to secure by Letters Patent is:

1. A system for transmission of signals between railway train and track section for the purpose of automatic train control, comprising a radioactive preparation of the type emitting $\gamma$-radiation arranged on said track section and detection apparatus for $\gamma$-radiation on said train.

2. A system for transmission of signals between railway train and track section for the purpose of automatic train control, comprising a radioactive preparation of the type emitting $\gamma$-radiation conveyed on said train and detection apparatus for $\gamma$-radiation arranged on said track section.

3. A system for automatic block signaling, comprising a radioactive preparation of the type emitting $\gamma$-radiation conveyed at the end of a railway train, detection apparatus for $\gamma$-radiation arranged on a track section near its advance end, and signaling apparatus operable upon receipt of a predetermined amount of energy from said radioactive preparation by said detection device, thus verifying that the whole of the train has passed out of said section containing said detection apparatus.

ERNST VOGT.
WALTER GERHARD HEILPERN.

REFERENCES CITED

The following references are of record in the file of this patent:

UNITED STATES PATENTS

| Number | Name | Date |
|---|---|---|
| 891,339 | Hirt | June 23, 1908 |
| 901,958 | Diehl | Oct. 27, 1908 |
| 1,351,182 | McQuillen | Aug. 31, 1920 |
| 1,662,429 | Lowy | Mar. 13, 1928 |
| 2,346,043 | Mysels | Apr. 4, 1944 |
| 2,456,233 | Wolf | Dec. 14, 1948 |